United States Patent
Nandula et al.

(10) Patent No.: US 12,430,605 B2
(45) Date of Patent: Sep. 30, 2025

(54) SYSTEMS AND METHODS FOR AUTOMATED INVENTORY CONTROL AND REPLENISHMENT OF DEPLETED GOODS

(71) Applicant: Teliiport, Inc, San Jose, CA (US)

(72) Inventors: Radha Nandula, San Jose, CA (US); Anil Lakshmi Narasimha Telikepalli, San Jose, CA (US)

(73) Assignee: Teliiport, Inc., San Jose, CA (US)

( * ) Notice: Subject to any disclaimer, the term of this patent is extended or adjusted under 35 U.S.C. 154(b) by 121 days.

(21) Appl. No.: 17/875,239

(22) Filed: Jul. 27, 2022

(65) Prior Publication Data

US 2023/0029808 A1 Feb. 2, 2023

Related U.S. Application Data

(60) Provisional application No. 63/226,082, filed on Jul. 27, 2021.

(51) Int. Cl.
*G06Q 10/087* (2023.01)
*G01G 19/414* (2006.01)
*H04W 4/38* (2018.01)

(52) U.S. Cl.
CPC ......... *G06Q 10/087* (2013.01); *G01G 19/414* (2013.01); *H04W 4/38* (2018.02)

(58) Field of Classification Search
CPC .... G06Q 10/087; G01G 19/414; G01G 17/04; G01G 19/42; H04W 4/38; H04W 4/35
See application file for complete search history.

(56) References Cited

U.S. PATENT DOCUMENTS

| | | | |
|---|---|---|---|
| 11,126,955 B1* | 9/2021 | Watson | G06Q 30/0633 |
| 11,195,189 B1* | 12/2021 | Advani | G06Q 30/0278 |
| 2007/0239569 A1 | 10/2007 | Lucas et al. | |
| 2016/0112216 A1 | 4/2016 | Sargent et al. | |
| 2016/0295358 A1* | 10/2016 | Cariss | H04W 4/02 |
| 2017/0300984 A1* | 10/2017 | Hurwich | G06Q 10/087 |
| 2018/0181906 A1 | 6/2018 | Baduge et al. | |
| 2019/0139386 A1* | 5/2019 | Arinze | G08B 21/24 |
| 2019/0215424 A1 | 7/2019 | Adato et al. | |
| 2019/0295148 A1* | 9/2019 | Lefkow | G06Q 10/0833 |
| 2019/0392378 A1* | 12/2019 | Alvo | G06Q 10/087 |
| 2021/0022928 A1* | 1/2021 | Radovcic | A61F 13/44 |
| 2022/0067689 A1* | 3/2022 | Guack | G06T 7/251 |

* cited by examiner

*Primary Examiner* — Florian M Zeender
*Assistant Examiner* — Anessa Deligi
(74) *Attorney, Agent, or Firm* — PdZ Patent Law, PLLC

(57) ABSTRACT

Systems and methods for carrying out automated inventory control by automatically sensing product levels in-situ, and automatically ordering new product when product levels are determined to be excessively low. Sensor modules may be placed under, over, or near products such as consumer goods, to continuously detect their levels as they are stored in normal use. When detected product levels are sufficiently low, new product can be automatically ordered, or instructions can be transmitted to refill or replace the product. In this manner, product depletion can be detected without user intervention or manual disturbance of the product, and new product can be automatically requested to refill or replace the depleted product.

37 Claims, 11 Drawing Sheets

SYSTEMS AND METHODS FOR AUTOMATED INVENTORY CONTROL AND REPLENISHMENT OF DEPLETED GOODS

PRIORITY

This application claims priority to, and the benefit of, U.S. Provisional Application Ser. No. 63/226,082, which was filed on Jul. 27, 2021 and which is herein incorporated by reference in its entirety.

FIELD

The present disclosure relates generally to inventory control systems. More specifically, the present disclosure relates to systems and methods for automated inventory control and replenishment.

BACKGROUND

Consumable product goods (CPG) like packaged food, office supplies, toiletries, medicines, and others are regularly purchased, stocked, consumed, then repurchased and restocked. This process occurs repeatedly in many different settings, such as homes, stores, warehouses, and the like. To restock products, users must typically visually inspect the remaining quantity of many different products, make a list of products that are depleted, and either order each product online or travel to one or more stores themselves to purchase. This process often involves significant time and effort.

SUMMARY

In some embodiments of this disclosure, systems and methods are described for more efficiently implementing inventory control of various products at homes, restaurants, offices, small businesses, and the like. In some embodiments of the disclosure, a system is implemented for automatically detecting depleted products and automatically re-ordering them. A number of sensor modules are provided for detecting the quantity of products that remain. The sensor modules monitor remaining product quantities, and a controller determines when the quantities drop sufficiently low that one or more products may be considered to be depleted. In some embodiments, upon depletion, a request such as an order is automatically transmitted to vendors for fulfillment. In this manner, product amounts are automatically monitored and when depletion or near-depletion of these products is detected, replacement quantities of the products are automatically requested from vendors so as to automatically replenish products when they become depleted. Users are thus saved the effort of constantly checking their products and manually acquiring replacement products. In some embodiments, the vendors may be retail stores, online stores, delivery services, distributors, product manufacturers, or any others. Orders can be fulfilled by one or many vendors choosing price, availability, and other such parameters. In some embodiments, vendors may compete with each other in a marketplace to service the order.

In some embodiments of the disclosure, a system for facilitating automated inventory control includes at least one sensor module having sensors configured for monitoring a quantity of a product, one or more processors, and memory storing one or more programs configured to be executed by the one or more processors. The one or more programs may include instructions for receiving, from the at least one sensor module, signals corresponding to the monitored quantity of the product, as well as determining, at least in part from the received signals, whether a depletion of the product has occurred. Instructions may also be included for, in response to a determination that a depletion of the product has occurred, automatically transmitting a request for an additional quantity of the product, so as to facilitate an automatic replenishment of the product.

In further embodiments of the disclosure, the request for an additional quantity of the product may be one or more of an order for the additional quantity of the product, an alert to the user to restock the product, or a request to the vendor for delivery of the additional quantity of the product.

In some embodiments of the disclosure, the quantity measured by the sensors may be any quantity, including for example a weight of the measured products. The sensors may thus be further configured for measuring the weight of the product.

In some embodiments of the disclosure, sensor modules may have any size and/or shape suitable for consistent measurement of product quantities over time. For example, each sensor module may have a substantially flat upper surface configured to support a container of the product thereon, the sensors of the each sensor module arranged to measure the weight of the container of the product and the product contained therein. That is, sensor modules may be configured so that products may be stably placed thereon for customary use. In some embodiments, a flexible sheet may have at least one sensor module affixed thereto, the sensors of the at least one sensor module affixed thereto being positioned to measure the quantity of the product within its supported container when the flexible sheet supports the container of the product thereon.

In some embodiments of the disclosure, each sensor module can include a wireless transceiver configured for wireless electronic communication with the one or more processors, the wireless electronic communication including transmission of the signals corresponding to the measured quantity of the product. Each sensor module may thus be configured to operate in accordance with a sleep mode in which the associated wireless transceiver is disabled to prevent performance of the wireless electronic communication, and a wake mode in which the associated wireless transceiver is enabled to perform the wireless electronic communication. Each sensor module may be further configured to transition its wireless transceiver from the sleep mode to the wake mode in response to a determination that the associated sensors have measured a change in the quantity of the product that exceeds a predetermined threshold value.

In some embodiments of the disclosure, the system may also determine a consumption pattern of the product from multiple ones of the signals received at different times, and may automatically order quantities of the product according to this consumption pattern or preset time intervals.

In some embodiments of the disclosure, determinations as to whether a depletion of the product has occurred are performed at least in part from both the received signal and the determined consumption pattern.

In some embodiments of the disclosure, the request for an additional quantity of the product may be an order of the additional quantity of the product, such as an online order placed with an electronic commerce website. Systems of embodiments of the disclosure thus may, prior to automatically transmitting the order, add a quantity of another product to the order which could be, but not necessarily close to its depletion or near-depletion, so as to group the additional quantity of the product and the quantity of another product into a single shipment. Systems may also determine a lowest price for the orders from among multiple sellers of the product, and an estimated time at which the order may be placed at the lowest price. Systems may then place the order at the estimated time and for the lowest price. Systems may also determine a minimum order threshold representing a threshold amount of the product to be ordered, adjust the ordered quantity of the product to meet at least the minimum order threshold, and place the order for the adjusted quantity of the product.

In further embodiments of the disclosure, a method for facilitating automated inventory control is described. This method may include receiving, from one or more sensor modules monitoring a quantity of a product, signals corresponding to the monitored quantity of the product; determining, at least in part from the received signals, whether a depletion of the product has occurred; and in response to a determination that a depletion of the product has occurred, automatically transmitting a request for an additional quantity of the product from sellers, so as to facilitate an automatic replenishment of the product.

In further embodiments of the disclosure, a non-transitory computer-readable storage medium is described. This storage medium may store executable instructions that, when executed by an electronic computing device, cause the electronic computing device to receive, from at least one sensor module having sensors configured for monitoring a quantity of a product, signals corresponding to the monitored quantity of the product; determine, at least in part from the received signals, whether a depletion of the product has occurred; and in response to a determination that a depletion of the product has occurred, automatically transmit a request for an additional quantity of the product from sellers, so as to facilitate an automatic replenishment of the product.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

In one embodiment, the disclosure relates to systems and methods for carrying out automated inventory control by automatically sensing product levels in-situ, and automatically ordering new product when product levels are determined to be excessively low. Sensor modules may be placed under, over, or near products such as consumer goods, to continuously detect their levels as they are stored in normal use. When detected product levels are sufficiently low, new product can be automatically ordered, or instructions can be transmitted to refill or replace the product. In this manner, product depletion can be detected without user intervention or manual disturbance of the product, and new product can be automatically requested to refill or replace the depleted product.

Figure 1:
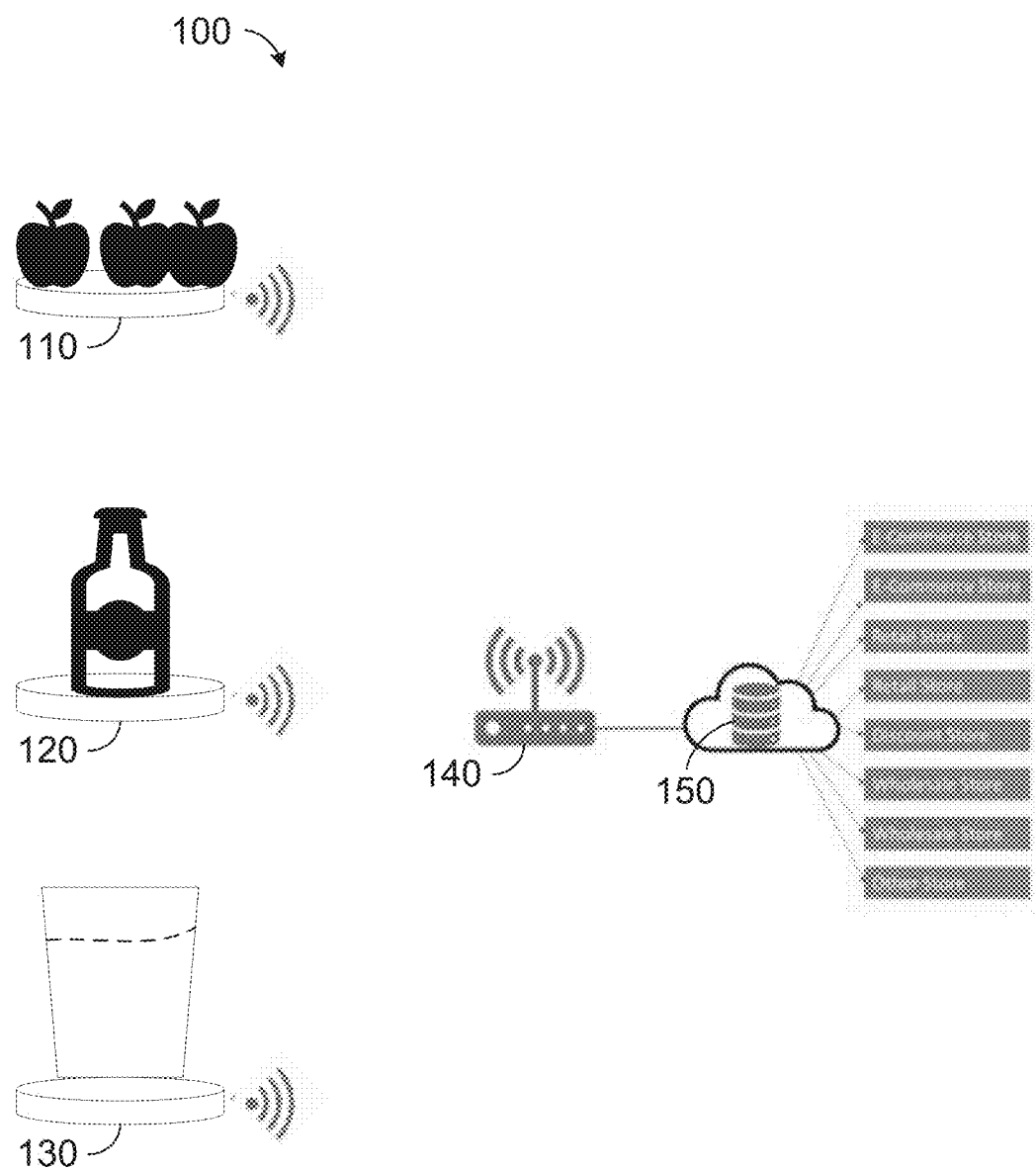
FIG. 1 conceptually illustrates an exemplary system for automated inventory control, in accordance with embodiments of the disclosure described herein.

FIG. 1 conceptually illustrates an exemplary system for automated inventory control, in accordance with embodiments of the disclosure described herein. In the example of FIG. 1, a system 100 for carrying out automated inventory control is described. System 100 includes any number of sensor modules 110, 120, 130 which are each configured to measure a quantity of a product placed in proximity thereto. For example, sensor modules 110, 120, 130 may be configured to measure weight, and may be designed so that products may be stably placed thereon as shown, allowing each sensor module 110, 120, 130 to monitor the weight, and thus the amount, of each product placed thereon. The sensor modules 110, 120, 130 are each configured to wirelessly communicate with a router 140, which is in turn in electronic communication with a computing device 150 that performs any number of the functions shown, including determining whether any products have been or will soon become depleted, communicating with a number of online stores (e.g., e-commerce stores, retail stores, discount stores, wholesale stores, a marketplace where multiple aforementioned stores compete, or any others) to re-order depleted or soon-to-be depleted products. The computing device 150 may be any computing device in electronic communication with router 140 and sensor modules 110, 120, 130 in any manner, such as one or more cloud-based servers or any other remote computing devices or resources, a local computing device such as a laptop computer or a desktop computer, or the like. This computing device, whether local or remote, may execute programs containing instructions for any of the functions of any of the embodiments described herein or thereby explained to one of ordinary skill in the art.

Figure 2:
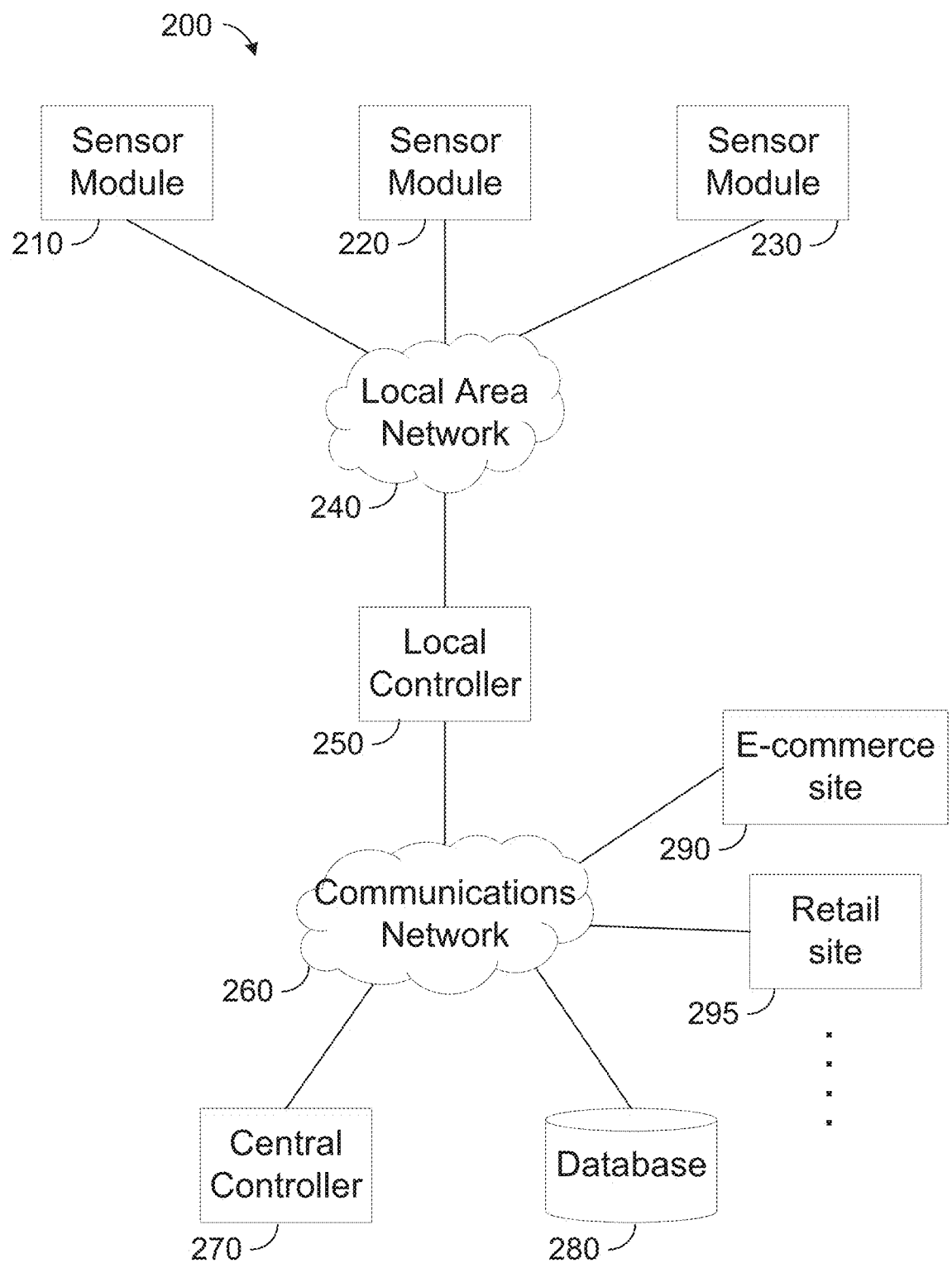
FIG. 2 is a block diagram illustration of one embodiment of an exemplary system of FIG. 1.

FIG. 2 is a block diagram illustration of one embodiment of an exemplary system of FIG. 1. System 200, which may be a block diagram representation of system 100, may include any number of sensor modules 210, 220, 230 each in electronic communication with a local controller 250 through a communications medium such as a local area network 240. Local controller 250 may in turn be placed in electronic communication with a central controller 270 via a communications medium such as communications network 260, which may be any electronic communications medium such as the public Internet. The central controller 270 may also employ one or more databases 280 to store and retrieve information as desired.

In operation of system 200, each sensor module 210, 220, 230 has one or more products placed thereon, and weighs each product at different times, e.g., periodically, when a change is detected such as an emptying or use of the product, or the like. The sensor modules 210, 220, 230 transmit their weight measurements to local controller 250 via local area network 240, which in turn may forward measurements to central controller 270 via communications network 260. Local Area Network 240 and Communications Network 260 can be based on any suitable wired or wireless standards. Central controller 270 may keep track of initial product amounts, such as by an initialization process further described below, and received weight measurements from sensor modules 210, 220, 230, to determine whether each product has been or will soon be depleted, and may automatically take various responsive actions to replenish these products. For example, central controller 270 may automatically place an order for replacement amounts of depleted products from any desired online resource, such as an e-commerce site 290 or retail site 295. Orders may, for instance, be placed for delivery to the site at which the measured products are located.

It may be observed that system 200 may be implemented in any physical location and in any context for which improved inventory control is desired. For example, system 200 may be implemented in a home or other domestic locale, for inventory control of consumer goods and other home products such as dry goods, foods, cleaning products, and the like. Sensor modules 210, 220, 230 may be placed in any home or domestic environment or area, such as a pantry, refrigerator, freezer, garage, cabinets, closets, or any other area in which goods are stored, and may wirelessly or through wired mechanism, transmit their weight measurement information to a local device such as a router 140 or local controller 250.

In some embodiments, local controller 250 may not be present, or may simply be a router 140 or another such device which forwards measurements to central controller 270. In this arrangement, central controller 270 may receive measurements from sensor modules 210, 220, 230, determine product depletion, and perform inventory control (e.g., reorder, request restocking, etc.). In other embodiments, central controller 270 and database 280 may not be present, with their functions performed entirely locally, by local controller 250.

Figure 3:
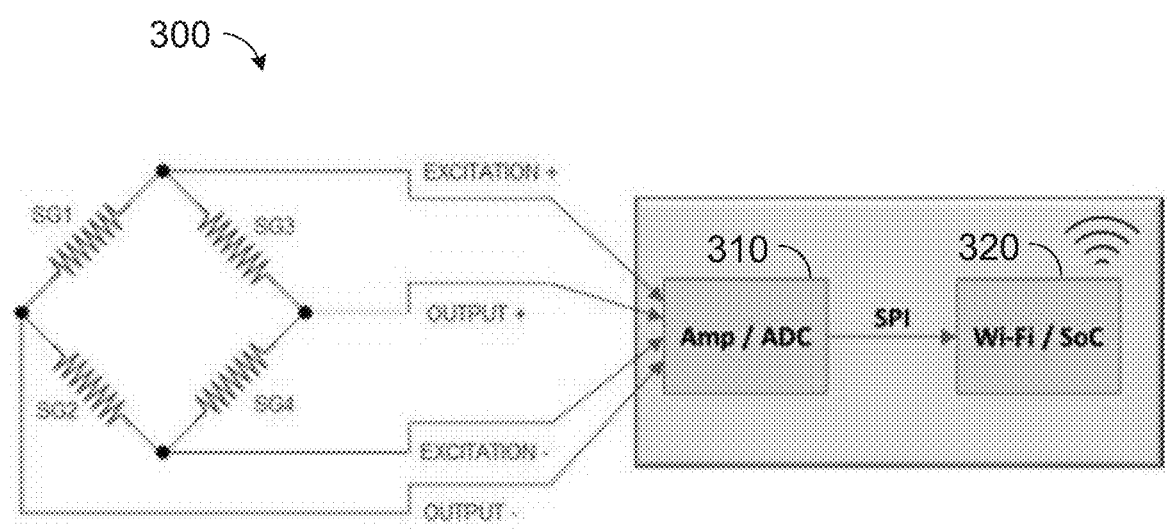
FIG. 3 is a generalized embodiment of an illustrative sensor module constructed for use according to embodiments of the disclosure described herein.

FIG. 3 is a generalized embodiment of an illustrative sensor module constructed for use according to embodiments of the disclosure described herein. Here, an illustrative sensor module 300 may be a physical module that provides one or more areas on which products may be stored, as well as sensors for weighing or otherwise measuring product quantities, and transmission/receiving capability for sending measurement data as well as receiving instructions. In some embodiments, sensor module 300 may measure product weight, and may include sensors that are analog strain gauges SG1-SG4 arranged in a Wheatstone bridge configuration as shown. Strain gauges SG1-SG4 are connected to an amplifier and analog to digital converter (ADC) 310 to convert their output to digital signals. A wireless digital transmitter/receiver implemented on a system on chip (SoC) 320 containing a microcontroller or other processing unit transmits these digital signals to, e.g., local controller 250, and may also receive instructions therefrom for, e.g., calibration, entering/exiting sleep and active modes, and the like. Sensor modules 300 may also have a power supply such as a coin cell battery (not shown) or other source of electricity to supply power to SoC 320. Transmission and reception of digital signals may be performed via any wireless network architecture and protocol, such as Wi-Fi using TCP/IP, Bluetooth, LoRA, GPRS, an 802.11 standard, a cellular standard, or the like. Each sensor module 300 may include any number of sensors and other electronic components, arranged in any configurations, as desired for accurate measurement of product quantity.

Sensor modules 300 are shown in FIG. 3 as utilizing strain gauges SG1-SG4. One of ordinary skill in the art will observe, though, that any types of sensors may be employed, to measure any quantity. For example, the sensors of modules 300 may be any type of load cell (metallic or otherwise) or force sense resistor, time-of-flight optical photoelectric sensors, level sensors, limit switches, cameras, or the like. In this manner, any property of products placed on, under, or near sensor modules 300 may be measured, such as weight, optical properties such as the level or volume occupied by a product, or any other physical quantity that may indicate an amount of product remaining.

Sensor modules 300 may include any physical configuration for supporting products thereon in a manner that allows for stable and continuous measurement of its quantity. For instance, sensor modules 300 may include a housing containing the components of FIG. 3 and on which products may be placed, such as the disc- or coaster-shaped outer housings of sensor modules 110, 120, 130 shown in FIG. 1. These housings may have any size and shape for stably supporting products of any size, shape, and weight. For example, circular or disc-shaped housings such as those shown in FIG. 1 may be employed for holding cylindrical containers of goods such as bottles or canned goods, while square or rectangular housings may be employed for supporting boxes, crates, or tubs of goods. These housings may be configured as thin (e.g., 3 mm to 10 mm in height, although any heights are contemplated) housings of any length/width (e.g., 4 cm, 6 cm, 10 cm, 15 cm square or rectangular major axis, although any dimensions are contemplated) for supporting any size goods. The housings may also take the shape of a cannister, jar, basket, bin, barrel, crate, or any other three-dimensional container. The housings may be made of any material suitable for long-term use in any environment, and may be rigid or flexible. In this manner, sensor module 300 housings may be placed beneath products in any environment to continuously monitor their weight or other parameters to detect product quantity, transmitting this information to a local controller 250 and/or central controller 270 for depletion determination and reordering as desired.

Figure 4:
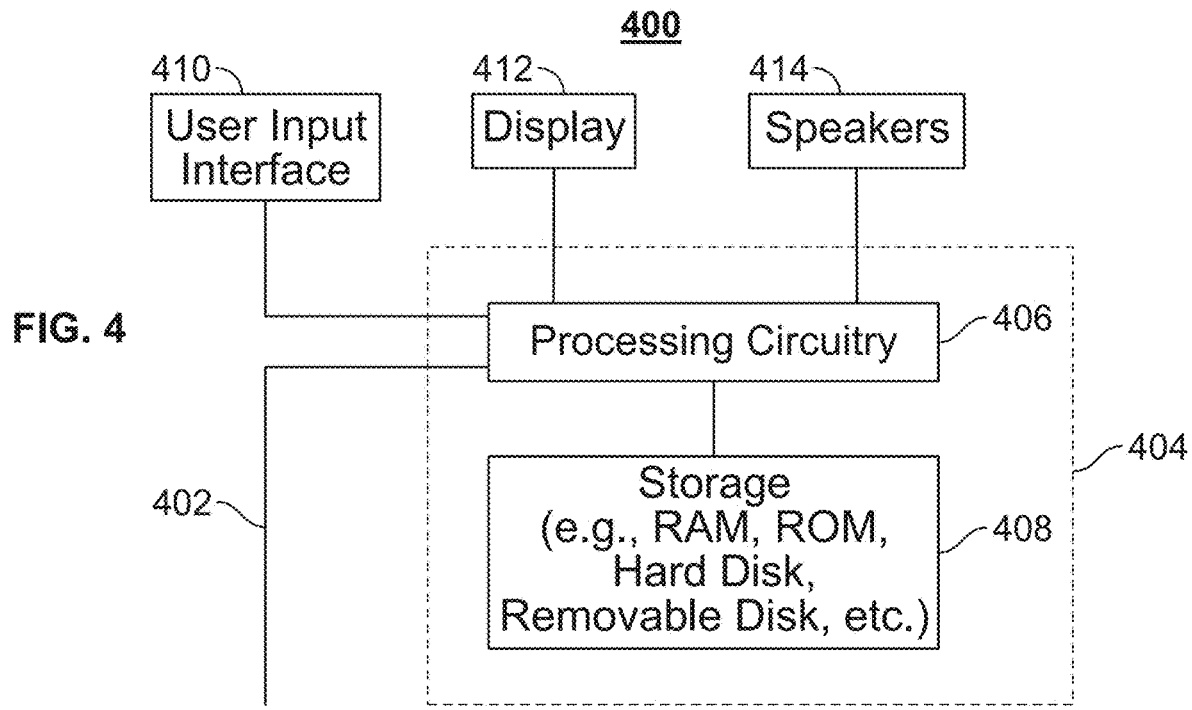
FIG. 4 is a generalized embodiment of an illustrative local controller constructed for use according to embodiments of the disclosure described herein.

FIG. 4 is a generalized embodiment of an illustrative local controller constructed for use according to embodiments of the disclosure described herein. Here, local controller 400 may be an embodiment of local controller 250 of FIG. 2. The local controller may also be contemplated as a router that routes signals in and out using wired or wireless protocols. Local controller 400 may receive instructions and data via input/output (I/O) path 402. I/O path 402 may provide instructions and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), SoCs, etc., and may include a single or multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an ARM M0 processor). In some embodiments, control circuitry 404 executes instructions for executing an application programming interface (API) or firmware for configuring and maintaining sensor modules 300, as well as receiving and transmitting weight measurements and other data therefrom.

Control circuitry 404 may thus include communications circuitry suitable for communicating with central controller 270 or other networks or servers, whether local, remote, cloud-based, or the like. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of data, such as instructions for implementing the above described API or firmware, for transmitting/receiving sensor data and instructions, for determining product depletion, for ordering replacement quantities of products, and the like. Nonvolatile memory such as but not limited to Flash memory may also be used (e.g., to launch a boot-up routine and other instructions). Cloud-based storage may be used to supplement storage 408 or instead of storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, smart phone, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, display for a personal computer, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images and product shopping lists. In some embodiments, display 412 may be HDTV-capable. In some embodiments, display 412 may be a 4D display, and the interactive media guidance application and any suitable content may be displayed in 4D. A video card or graphics card may generate the output to the display 412. The video card may offer various functions such as accelerated rendering of 4D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

Figure 5:
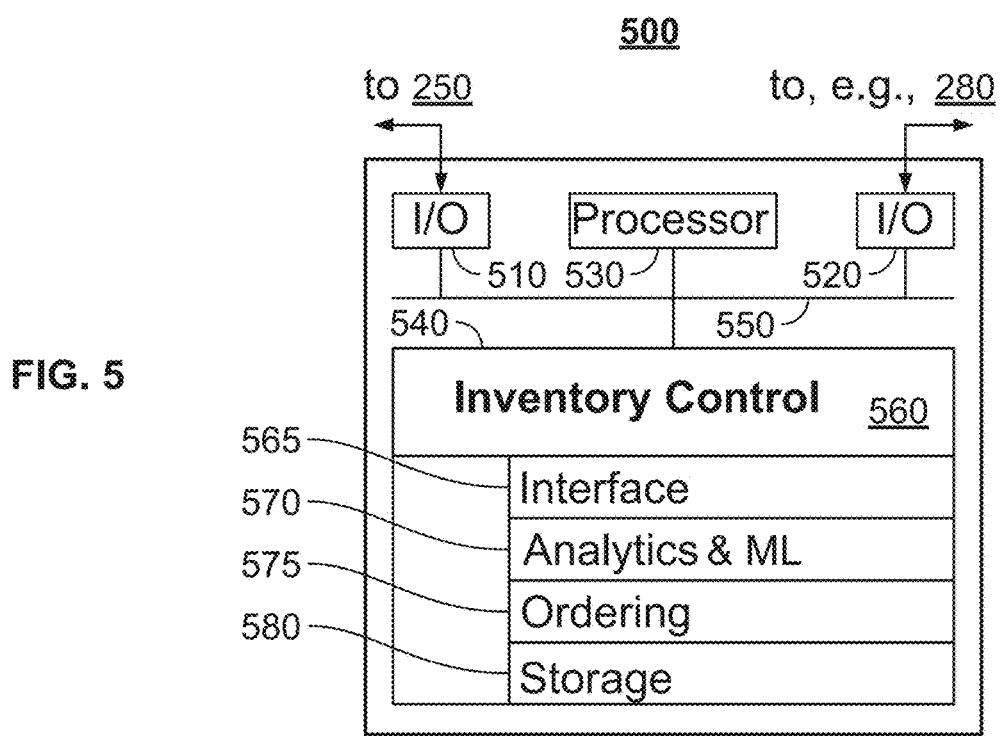
FIG. 5 is a generalized embodiment of an illustrative central controller constructed for use according to embodiments of the disclosure described herein.

FIG. 5 is a generalized embodiment of an illustrative central controller constructed for use according to embodiments of the disclosure. Here, device 500 may be an embodiment of a central controller 270, and in some embodiments may implement inventory control processes described herein. Device 500 may receive content and data via I/O units 510 and 520. I/O unit 510 may receive sensor measurements from sensor modules 300 and may transmit instructions thereto for, e.g., entering/exiting sleep/active modes. I/O unit 520 may provide data to, and receive content from, one or more databases 280 as well as, e.g., e-commerce sites 290, and retail sites 290. Like the local controller 400, the device 500 has a processor 530 or processing circuitry, and storage 540. The processor 530 and storage 540, along with I/O units 510 and 520, are in electronic communication with each other via a communications medium 550 such as a bus. The processor 530 and storage 540 may be constructed, and may operate, in similar manner to the respective components of local controller 400.

Storage 540 is a memory that stores a number of programs for execution by processing circuitry 530. In particular, storage 540 may store one or more inventory control programs 560 that may include device and site interfaces 565, an analytics & machine learning (ML) module 570, a product ordering module 575, and storage 580. The interfaces 565 are interface programs for handling the exchange of commands and data with the sensor modules 300, local controller 250, and remote sites such as e-commerce sites and delivery services 290 and retail sites 295 directly or through a marketplace using, e.g., an API. Analytics & ML module 570 includes one or more programs for analyzing product levels remaining, and determining product depletion. Module 570 may also include one or more machine learning models trained to learn user consumption behavior and determine product depletion according to learned behavior. Ordering module 575 includes one or more programs for ordering replacement products through remote sites such as e-commerce sites and delivery services 290 and retail sites 295, while storage and database module 580 provides memory for storing commands and data used by any of the other modules 565, 570, 575, 580.

One of ordinary skill in the art will appreciate that inventory control programs 560 may reside on, and be executed by, any suitable electronic computing device. For example, programs 560 may reside on and be executed by device 500 as shown, or may reside on and be executed by local controller 250, e.g., device 400, instead.

The device 500 may be any electronic device capable of performing inventory control operations described herein. For example, the device 500 may be a server computer located proximate to the sensor modules 300, e.g., within the same home. Alternatively, the device 500 may be a remote device such as a cloud server. The device 500 may alternatively be a laptop computer or desktop computer configured as above.

Figure 6:
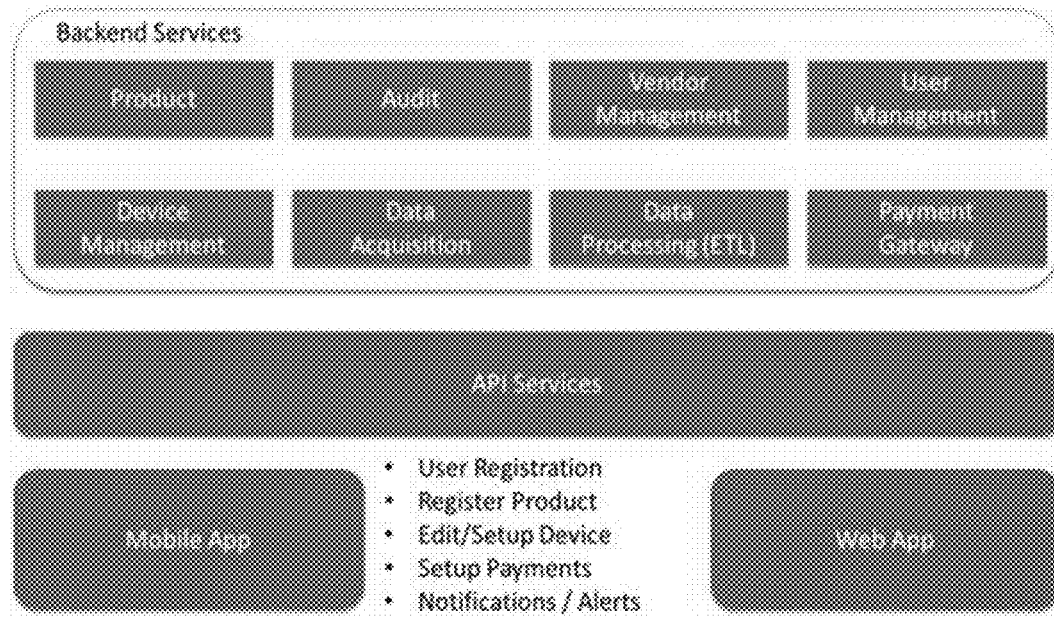
FIG. 6 illustrates exemplary services implemented by the central controller of FIGS. 4-5, according to embodiments of the disclosure described herein.

FIG. 6 illustrates exemplary services implemented by the central controller of FIGS. 4-5, according to embodiments of the disclosure described herein. Multi-way API services are contemplated. As above, an API may be generated by, e.g., local controller 250, may handle routing of product measurements from sensor modules 300 to any other devices such as central controller 270, and may be available to interface to any other devices or services and provide value added services. The API may also be used by the central controller to place orders with sellers, i.e., may perform ordering as described herein. The API may also perform any other desired functions, such as executing user registration processes, product registration, device (sensor module 300) setup and configuration, payment setup including entry of payment information, notification/alert setup, and any other functions that may be desired. This allows users to customize the operation of system 100 to their liking. In some embodiments, APIs may thus implement an initial registration and setup process on startup, to inform system 100 of the identity of users, as well as the number of sensor modules 300 and their products being measured. APIs may have associated applications such as a mobile app or web app, each of which can be stored on and executed by central controller 270 for access by users on their mobile or desktop devices. Sellers or other vendors can also use API to set order price or availability limits to automatically service an order posted to a marketplace. In one example, a seller may choose to set a price range or time range within which they are willing to service the order.

A number of backend services may also be provided by central controller 270. As nonlimiting examples, these include device management, data acquisition, data processing, and provision of a payment gateway. Device management may provide parameters for entry by the user, to control operation of sensor modules 300. For example, users may be able to enter the type of goods measured by each module 300, their initial weight/volume, or the like, as well as sensor parameters such as measurement frequency (to manage battery life). This information may be stored in, e.g., database 280 for retrieval and use by programs 560 as desired. Data acquisition may then handle transmission of sensor data to central controller 270. Data processing may include the determination of whether product depletion has occurred, including determination of depletion or product use patterns if desired. The payment gateway may store (e.g., in storage 580 or database 280 or interface to a $3^{rd}$ party service) the identities of sites to be used for product ordering, as well as payment information gathered from users via the API, such as during setup/registration. Any other desired services may be provided by central controller 270.

Figure 7:
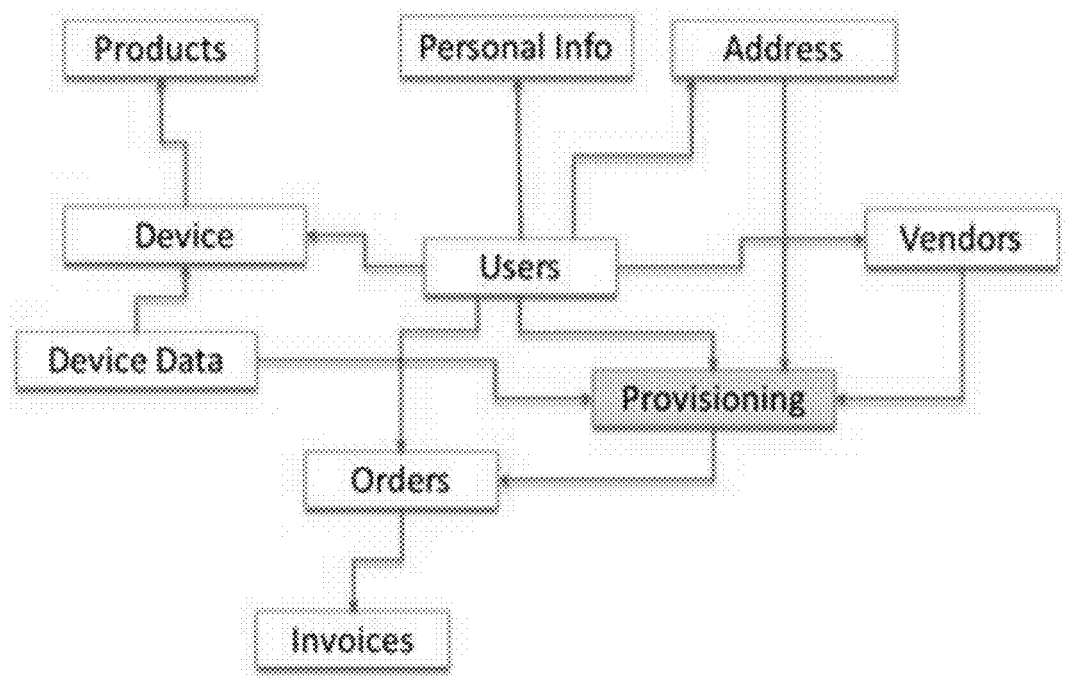
FIG. 7 illustrates exemplary data flow in systems constructed according to embodiments of the disclosure described herein.

FIG. 7 illustrates exemplary data flow in systems constructed according to embodiments of the disclosure described herein. Users may provide information to central controller 270 via an API as above, implemented on local controller 250. This information may include any information gathered by the API during setup/registration, including device (sensor module 300) numbers and identities, user personal and address information for security and ordering purposes, the identities of vendors to use in product ordering (e.g., e-commerce site addresses, etc.), as well as any other provisioning and ordering information that may be desired. This information may then be used to ensure data collection from the correct sensor modules 300, determination of product depletion, and corresponding order generation including invoice generation, shipping and tracking information, and transmission to/from the vendors.

Figure 8:
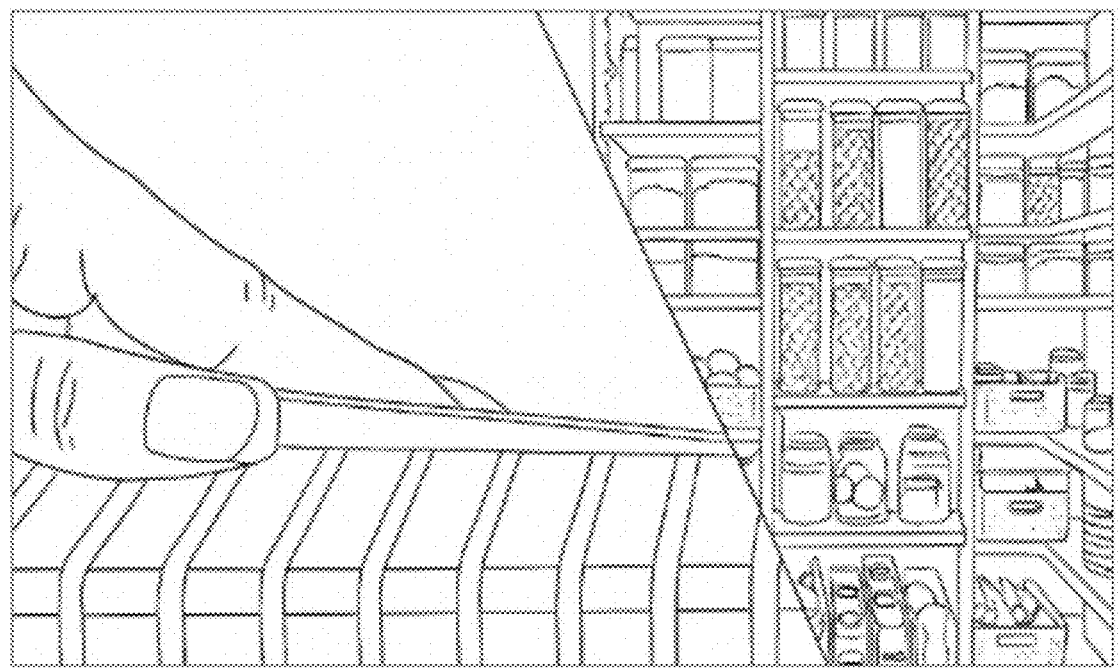
FIG. 8 illustrates exemplary sensor module construction and use in accordance with embodiments of the disclosure described herein.

FIG. 8 illustrates exemplary sensor module construction and use in accordance with embodiments of the disclosure described herein. As above, sensor modules 300 may be configured in any manner. In some embodiments, it is beneficial to configure modules 300 as flat, flexible sheets with a flexible outer body made of a pliable material such as a soft plastic, rubber, or the like, with the above-described sensors being embedded therein. The embedded sensors may face an upper surface of the flexible sheet, so that products placed thereon are positioned over the sensors for weighing at desired times. The sensors may also be configured in a structured or unstructured array in such a sheet. In this manner, the sensor modules 300 may be implemented as flexible sheets that can be unfolded or unfurled, as shown in the leftmost image of FIG. 8. These sheets may then be placed on any surface where products are stored, such as the upper surfaces of any of the pantry shelves shown in the rightmost image of FIG. 8. Accordingly, embodiments of the disclosure allow for placement of sensor modules 300 in any desired location, for managing inventory and automatically reordering any products therefor. For example, sensor modules 300 may be placed within home pantries as shown in FIG. 8 to automatically reorder consumable goods such as dry goods, canned goods, and the like for a household. Similarly, sensor modules 300 may be placed within a business to automatically determine remaining amounts of, and reorder, goods consumed by businesses, such as office supplies, warehoused goods, and any industrial products. Use of systems 100 with products in any context are contemplated.

Figure 9:
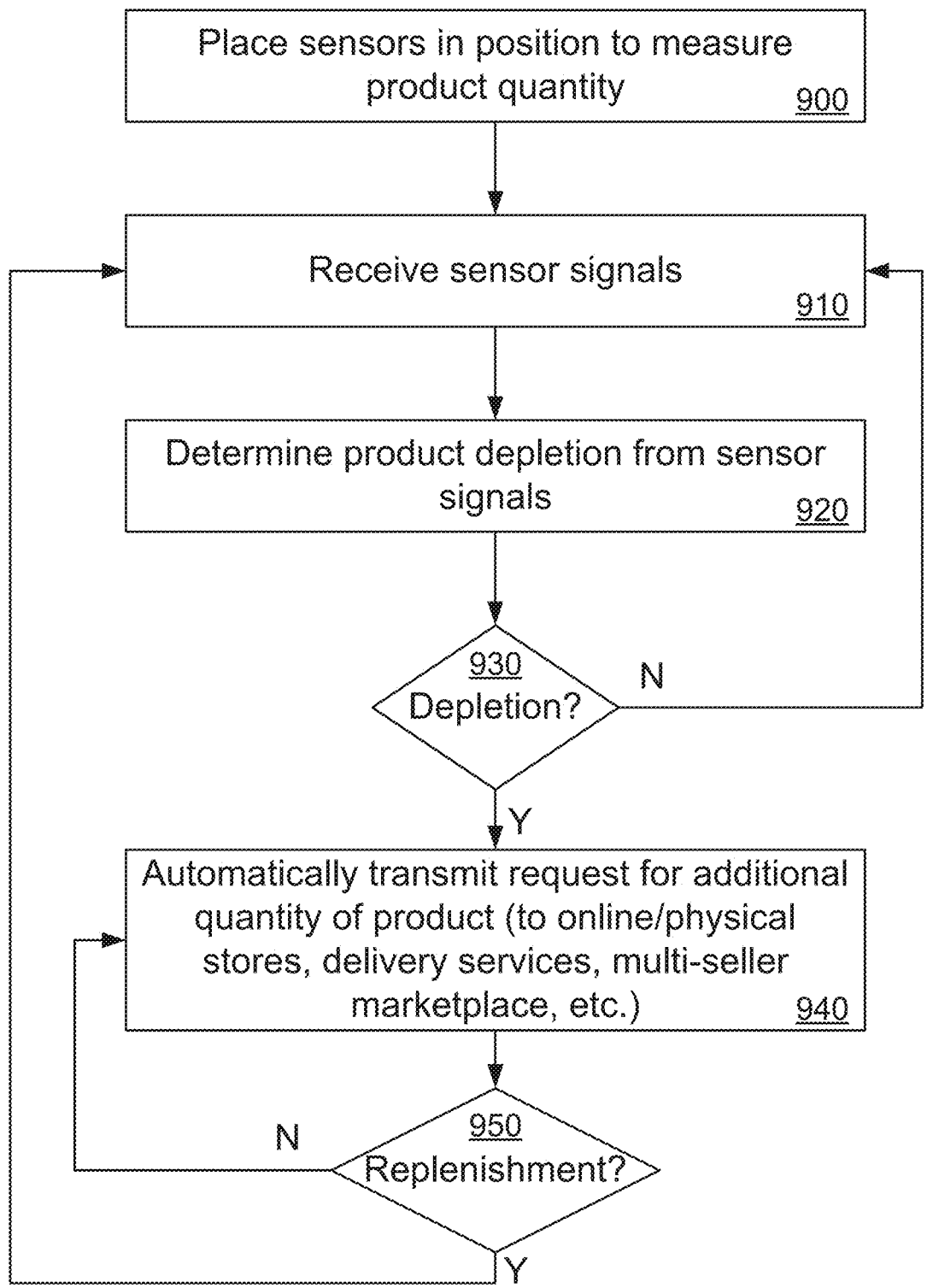
FIG. 9 is a flowchart illustrating process steps for automated inventory control, in accordance with embodiments of the disclosure described herein.

FIG. 9 is a flowchart illustrating process steps for automated inventory control, in accordance with embodiments of the disclosure described herein. Initially, the above described API may be employed to implement a registration and setup process, in which users enter information such as the number or identification of sensor modules 300 used, as well as the goods monitored by each and their initial weights. The API may also collect web addresses of e-commerce sites or other sites used to reorder products, comparative pricing, payment and shipping information, any system parameters desired (e.g., monitoring interval times, etc.), as well as any other information desired. As part of this process, users may place each sensor module 300 in position to measure product quantities (Step 900), such as on pantry shelves where goods are to be placed, or the like. The exact product may be specified by the user, e.g., by selecting the name of the product using a test string search or by scanning the SKU using the camera of a device such as a smart phone. Once products are placed thereon, sensor modules 300 may periodically weigh their products, i.e., determine weight values and transmit them to local controller 250 and/or central controller 270. These controllers may then receive these sensor signals (Step 910). If central controller 270 is configured to execute inventory control programs 560, analytics module 570 of controller 270 determines, from the received sensor signals, whether any of the products measured by sensor modules 300 has become or will soon become depleted (Step 920), i.e., if a sufficiently small quantity of the product remains that it should be reordered.

If depletion has been determined to occur (Step 930), ordering module 575 automatically transmits a request for an additional quantity of the product that has been found to be depleted (Step 940). The request can be any request for additional product, such as an order sent to a vendor, an order sent to a delivery service, an order sent to a marketplace of multiple vendors, an alert or warning sent to a user or system 100 displayed on, e.g., display 412 of local controller 400 that the identified product is running low and should be replenished, or the like. If depletion has not been determined to occur, the process returns to Step 910, and monitoring of the various products continues.

Once the depleted product has been replenished by the user by placing it on to the sensor modules 210, 220, 230 (Step 950), the process returns to Step 910, and monitoring of the various products, including the now-replenished product(s), continues. If the product has not been replenished, the process may return to Step 940 at various desired times, to transmit an additional request or order, or otherwise indicate to users that the product still remains depleted.

Product orders may be made in any desired manner. As one example, users can reorder from their preferred vendor by each product, or allow ordering module 575 to shop for the lowest price from any vendor, set lowest price target, post the order to a marketplace of vendors that compete to fulfill it, or ask to group them the shipments from a single or multiple vendors. In one example, orders may be automatically placed as soon as product quantity reaches a predetermined reorder threshold. In another example, by detecting reorder threshold levels of multiple products and by calculating the required replenishment date based on user consumption pattern and product shipping time, multiple products can be grouped together into a single shipment to, e.g., reduce costs and environmental impact. Similarly, ordering module 575 may monitor price change patterns at each vendor, and delay reordering until a lowest price is expected or detected. Users can also choose to add a predetermined item such as an add-on product on-demand or at a preset interval to add to the shipment.

Embodiments of the disclosure may also establish an electronic marketplace, such as via a web app or API, allowing vendors to bid or otherwise submit offers to win product orders. More specifically, an API may allow vendors to submit their criteria by which they offer to fulfill the order, such as by submitting prices or price ranges they are willing to offer, times by which they may ship or deliver, or any other parameter. Systems of embodiments of the disclosure may then compare the received criteria from each vendor, and select the vendor whose criteria are most advantageous, e.g., the lowest price offered, fastest shipping, or the like. In this manner, systems of embodiments of the disclosure may effectively set up a form of reverse auction allowing multiple parties to bid to be selected to fulfill an order.

In some embodiments, product depletion may be determined in any manner, and via any criteria. In some embodiments, depletion may be determined using an initial measuring period in which goods are measured at specified intervals (e.g., once per day) to determine consumption patterns, followed by ordering based on the pattern(s) once determined. Consumption patterns may be estimated in any manner, such as by extrapolation of measurements taken at specified intervals. Depletion may also be determined according to one or more predetermined values, such as preset or user-set order periods for various goods, or simply when quantities of products drop below a preset level or amount. Consumption patterns may also be estimated via one or more machine learning models which may be any models having measurement values or representations thereof, as well as any other useful information such as time, season, number of people in household, etc., as inputs and having as output likelihoods of depletion, perhaps at various times. Such models may, for example, be trained using existing product measurements over time, as well as other input data, labeled with corresponding depletion/no depletion labels. Such machine learning models are known, and use of any such models is contemplated.

Depletion, and thus reordering, may be based on a predetermined threshold amount set by either the user or automatically by programs 560, a duration at which goods are expected to last based on user's consumption pattern, or the like. In some embodiments, measurements may continue at any intervals after patterns are determined, such as at the same frequency or a lower frequency to, e.g., reduce power consumption and conserve battery life. Measurement may also be adaptive, returning to a default or more frequent measurement rate once it has been determined that consumption has deviated from the previously-determined pattern, after a large unexpected consumption spike, or the like.

Consumption patterns may be determined for each product measured, using product quantity measurements in any manner and such as by leveraging adaptive machine learning algorithms implemented in central controller 270 as above. Depletion may thus be determined using both specific measurements (i.e., depletion is determined to occur when measurements fall below a predetermined weight), and consumption pattern (i.e., depletion is determined when measurements and predicted pattern result in an estimate that product amounts will fall below some predetermined level within some predetermined time). In some embodiments, weight measurements may be converted to % quantity, item volume or number quantities for ease of inspection or reordering, e.g., 10 eggs rather than N pounds of eggs or x% of flour rather than 2.5 lbs of flour. This may be accomplished in any manner, such as by automatic conversion of weight to % or number quantity based on measured weight and product identification, such as via detected product stock-keeping unit (SKU), user entry of the item type, or the like. In some embodiments, users may also enter initial values of weights for each product, for depletion determination. In some embodiments, users may additionally specify depletion threshold weights or amounts, or such amounts may be automatically determined or estimated by programs 560.

Figure 10:
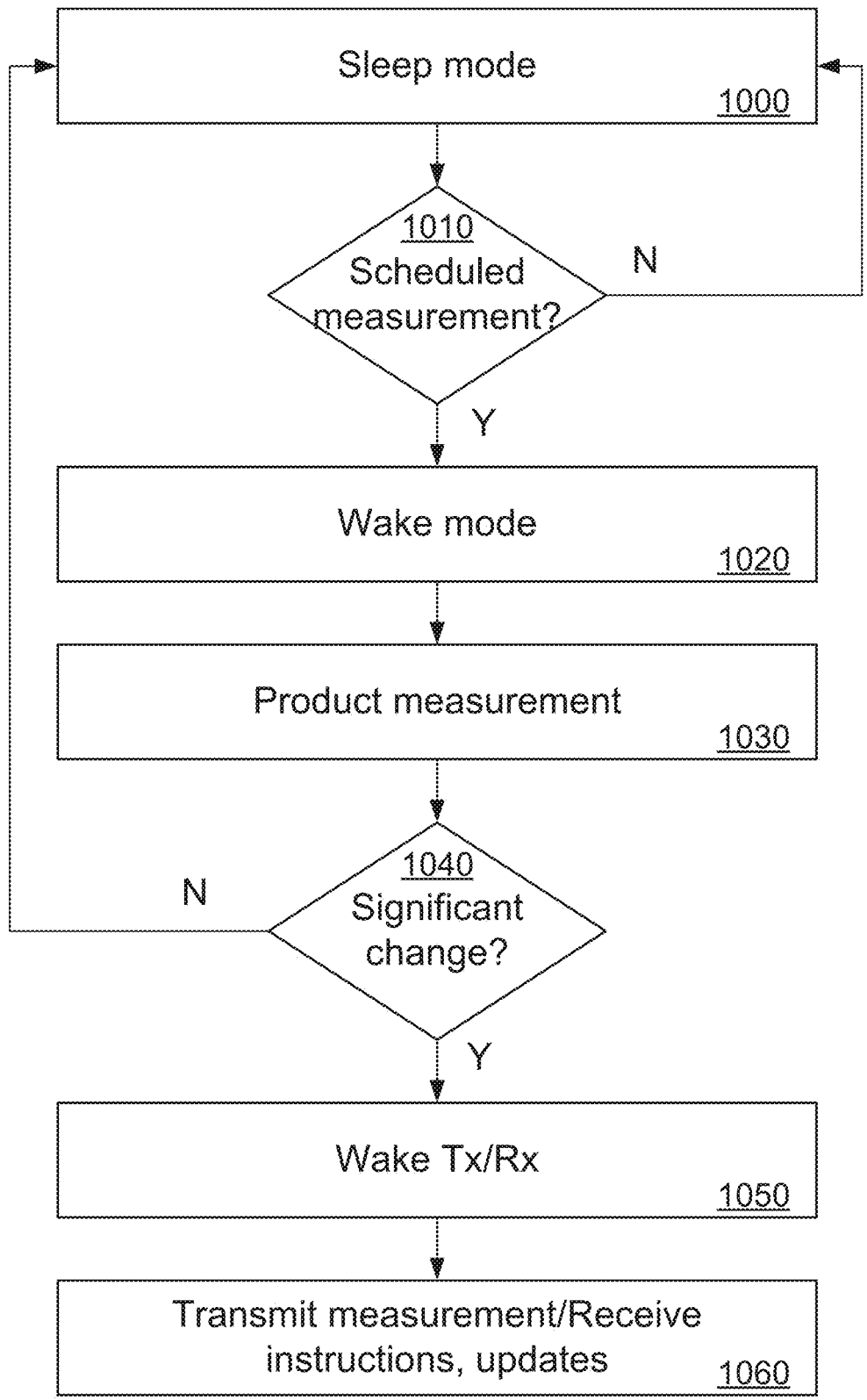
FIG. 10 is a flowchart illustrating process steps for power management in automated inventory control, according to embodiments of the disclosure described herein.

FIG. 10 is a flowchart illustrating process steps for power management in automated inventory control, according to embodiments of the disclosure described herein. It may be desirable to reduce power consumption in sensor modules 300, e.g., to improve battery life. Accordingly, in some embodiments of the disclosure, sensor modules 300 may operate according to power saving modes in which SoC 320, and any wireless transceiver thereof in particular, are deactivated when no data are sent or received. As one example, SoCs 320 and amplifier/ADC 310 may be programmed or instructed to enter a sleep mode (Step 1000) when their wireless transceivers are not to send or receive data, or no measurements need be made. In such a sleep mode, power to any components of SoC 320 that are not presently required may be reduced or switched off. For example, power to the wireless transceiver circuit(s) may be reduced or cut off. Power to other components besides those such as a system clock and standby circuits may also be reduced or switched off if desired. Accordingly, sleep modes of embodiments of the disclosure may encompass any modes in which power to any circuitry is reduced or cut off.

In some embodiments of the disclosure, times can be specified via API for sensor measurements. That is, product weights or other properties may be measured at specified times. When such a time occurs (Step 1010), those components or circuits of SoC 320 and/or amplifier/ADC 310 required for sensor measurements are entered into their wake mode (Step 1020), in which sufficient power is supplied for sensor measurements to be taken and stored. Measurements are then taken (Step 1030), and SoC 320 determines whether a sufficient change has occurred from the last measurement (Step 1040). That is, SoC 320 determines whether an appreciable amount of the product has been consumed. If not, e.g., if the product has remained unchanged since the last measurement was taken, measurements are not transmitted, and the process returns to Step 1000, with amplifier/ADC 310 and SoC 320 re-entering sleep mode until the next scheduled measurement time. If product levels have changed, then the new measurement is transmitted. The wireless transceiver of SoC 320 is woken (Step 1050), along with any other components employed in data transmission, and the new sensor measurement is transmitted (Step 1060) to, e.g., local controller 250. Similarly, data may also be received. Received data may include, e.g., instructions including instructions to initiate a calibration process for any of the sensor modules 210, 220, 230, instructions to initiate any desired updates such as firmware updates, and the like. When the data are being transmitted, the central controller 270 and/or local controller 250 may also check and receive signal to calibrate the sensor modules to compensate for temperature and normal drift, as well as upgrade to latest firmware. The process may then return to Step 1000 if desired, with SoC 320 and/or amplifier/ADC 310 re-entering sleep mode until the next scheduled measurement time. In this manner, power may only be supplied to components of sensor modules 300 when they are needed for measurement or data transmission/reception, with these components entering sleep mode at other times. In such embodiments, power is conserved and battery life is improved.

In some embodiments, each measurement may be transmitted. That is, Step 1040 may be optional. Additionally, sensor measurement times may be determined in any manner. For example, measurement times may be pre-specified by the system 100, e.g., daily, every 8 hours, or the like. Alternatively, users may specify measurement intervals via an API. Measurement times may also be automatically determined by inventory control programs 560 in any manner, including an adaptive manner in which consumption patterns are estimated or determined by analysis of sensor measurements, and measurements are taken less often when product use is not expected. Users may also, for example, specify via API when they are not using any product, e.g., vacation times when users are away from the home, and no measurements should occur. Any method of specifying or estimating measurement times is contemplated.

In some embodiments of the disclosure, power management or reduction in battery energy consumption may also be achieved by reducing transmit and receive times. As one example, transmit/receive times may be reduced by eliminating handshake processes when the sensor modules 300 wake from sleep modes. That is, while some sensor modules 300 may perform a handshake process when they wake, to re-connect to and begin to exchange data with other elements of system 100 such as local controller 250 or a router, some embodiments may eliminate this handshake process if desired, and simply transmit information such as an identifier, security information such as a password or other code, or the like, without first transmitting any handshake messages. In this manner, the time taken in conducting the handshake process is eliminated, and the transceiver may be entered into sleep mode more quickly. In some embodiments, it may thus be possible to reduce time spent in each wake cycle by several seconds. In embodiments of the disclosure, implementation of one or more of these power management methods may result in a sensor module 300 which may operate as described herein on for example, a single coin cell battery for a period of up to multiple years. Any battery types are contemplated.

Figure 11A:
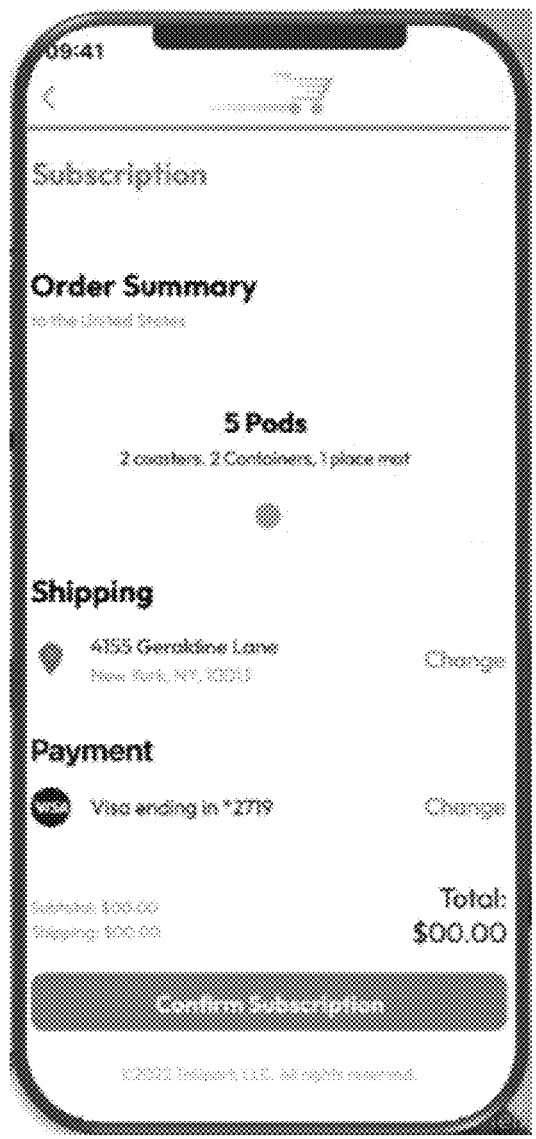
FIGS. 11A-11D illustrate process steps for system setup according to embodiments of the disclosure described herein.
Figure 11B:
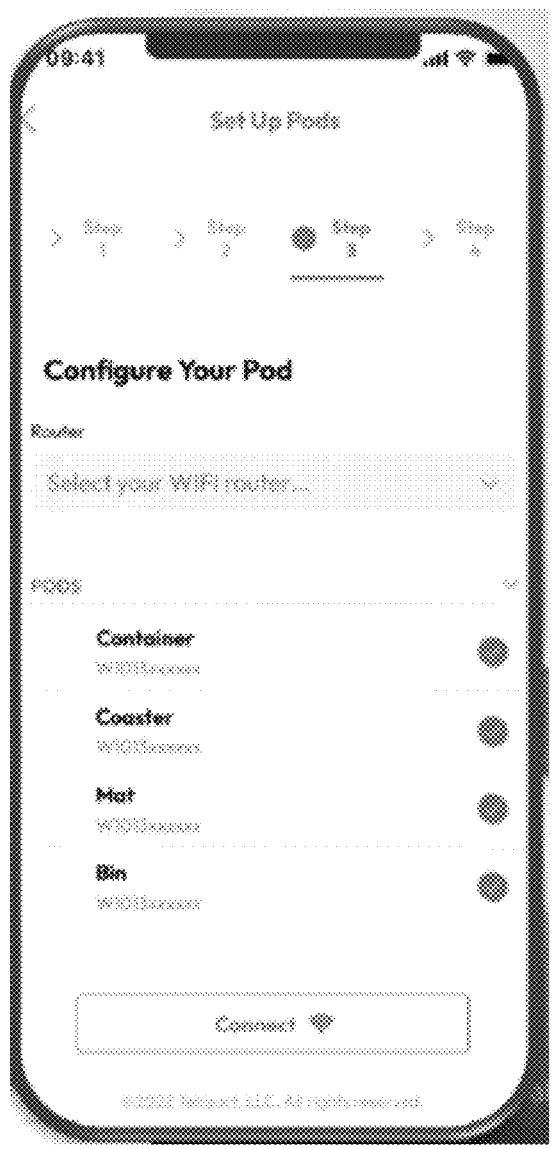

Embodiments of the disclosure contemplate setup and use of systems described herein, in any manner. FIGS. 11A-11D illustrate process steps for system setup according to embodiments of the disclosure described herein. Setup may include signup, connection, and option setup processes. For example, as shown in FIG. 11A, users may be prompted to register or subscribe via a mobile app or API screen such as that shown. The subscription/registration process may be any process that requests identifying information from users. For example, selection of the "Confirm Subscription" button shown may prompt the user to enter any identifying information and login information. As shown in FIG. 11B, users may then be presented with a screen requesting connection information, or information for connection to a local area network 240 or other electronic communications medium. In some embodiments, users may be prompted to connect each sensor module 300 individually, as shown. Users may also be prompted to specify the type of product each sensor module 300 is intended to measure, and/or the type or configuration of each sensor module 300 (e.g., mat, coaster, bin, etc.). Alternatively, each sensor module 300 may automatically specify its type or configuration.

Figure 11C:
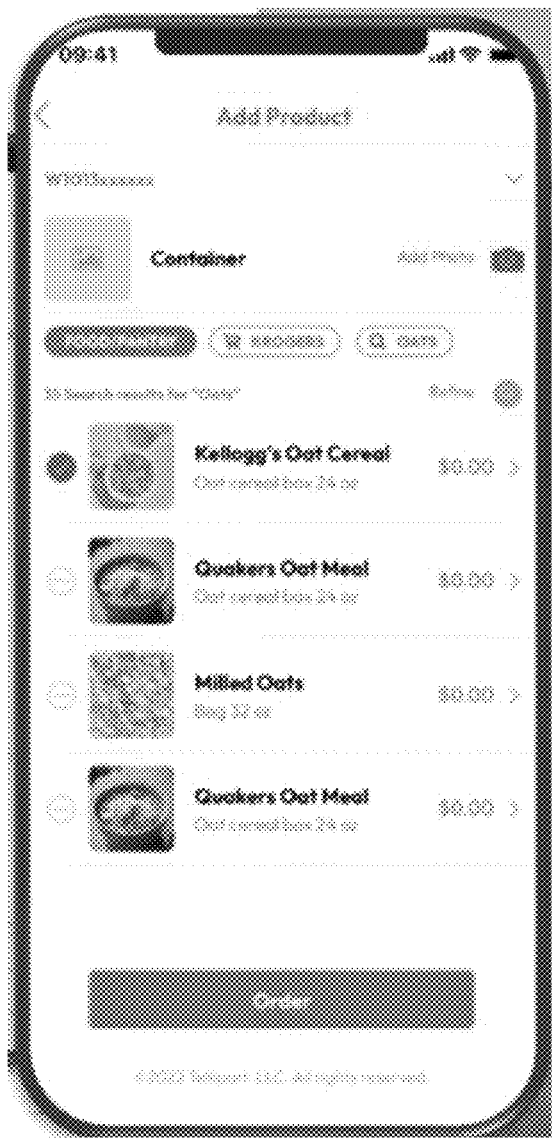

Once each sensor module 300 is connected, users may be prompted to select from various setup options, as shown in FIG. 11C. In some embodiments, this may include user specification of the goods or product that each sensor module 300 will monitor. As one example, database 280 may store relevant specifications of a number of different products such as consumer goods (e.g., sizes, weights, identifiers, and the like), and users may select from among these products as shown. In this manner, system 100 is provided with information indicating initial, nominal, or "full" weights of products. In some embodiments, a search function may be provided for users to find appropriate products by keyword or text search or a scan of the product SKU barcode using a smart phone.

Figure 11D:
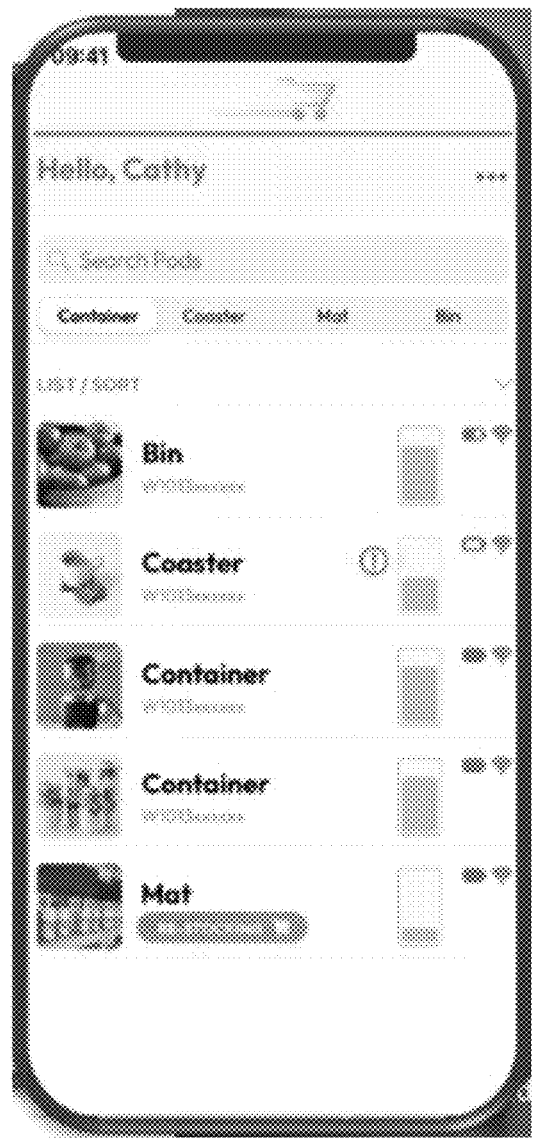

System 100 may then monitor products as described herein, and display depletion levels of each as shown in FIG. 11D. Depletion levels may be displayed graphically as shown, with warning icons, re-stocking prompts, or reordering icons presented. Battery charge levels of each sensor module 300 may also be displayed. In this manner, users may be presented with a convenient and user-friendly real-time summary of products being monitored.

Figure 12A:
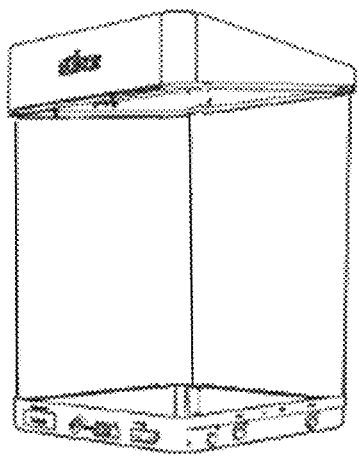
FIGS. 12A-12C illustrate exemplary sensor module configurations according to embodiments of the disclosure described herein.
Figure 12B:
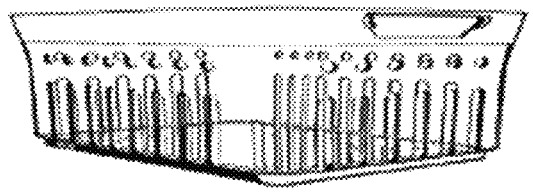
Figure 12C:
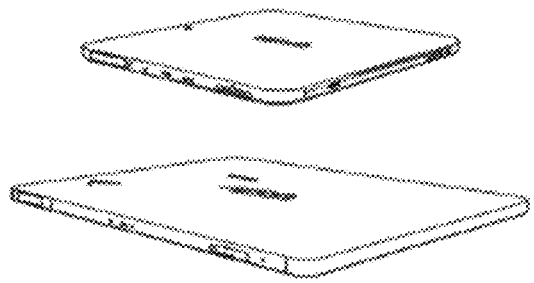

FIGS. 12A-12C illustrate exemplary sensor module configurations according to embodiments of the disclosure described herein. As above, sensor modules 300 may be constructed in any form or configuration desired. As one example, sensor modules 300 may be formed as a container or portion thereof, such as shown in FIG. 12A. Here, sensors of sensor module 300 are integrated into the bottom surface of the container shown, so that products poured or dropped therein may be continuously monitored while they are stored. Similarly, sensor modules 300 may be integrated into the lower (or any other) surface of a bin or other open-ended container, as shown in FIG. 12B, for continuous monitoring of any products placed therein. It may also be seen that sensor modules 300 may be configured with a rigid housing containing sensors arranged therein for weighing (or monitoring of other quantities) of products placed on housing upper surfaces. These housings may be of any size, shape, and configuration, e.g., square shaped in plan view, rectangular, circular, or any other shape suitable for supporting any sized and shaped products or containers. Sensor modules visually display status through an LED and contain on/off and pushbuttons that help user observe/setup It is also noted that sensors may be embedded directly within containers. That is, the sensor module 300 may itself be a container. For example, in FIG. 12A, sensors and each of the other components of FIG. 3 may be embedded in the bottom surface of the container shown, so that the container itself is configured to measure goods stored therein and transmit this measurement information.

In some embodiments of the disclosure, sensors may be positioned within sensor modules 300 or any other housing, in distributions that allow for multiple products or containers to be placed on a single module 300, so that each product or container may still be monitored individually. For example, sensors may be distributed across module 300 or its housing, and a camera or other device may be employed to determine the position of each product/container on the housing. In this manner, the location of each product/container with respect to each sensor may be determined, allowing for more accurate determination of each product's weight from the various sensor measurements. Any means or method of determining product position relative to sensor module surfaces or sensor locations is contemplated.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any sensors may be employed to determine product amounts in any manner, and depletion of those products may be determined or estimated via any method. Ordering of depleted products may automatically occur in any manner, via any services or vendors or marketplaces. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A system for facilitating automated product reorder, the system comprising:
   at least one sensor module having battery-powered sensors configured to perform measurements of one or more properties of a product for monitoring a quantity of the product, each sensor module including a wireless transceiver that is configured to operate in a sleep mode when the wireless transceiver is not to send or receive data;
   one or more processors; and
   memory storing one or more programs configured to be executed by the one or more processors, the one or more programs including instructions for:
     receiving, from the at least one sensor module, first signals corresponding to the monitored quantity of the product;
     sending, in response to receipt of the first signals, second signals to the at least one sensor module to update firmware of the at least one sensor module;
     sending, in response to receipt of the first signals, third signals to the at least one sensor module for calibrating the at least one sensor module, to compensate for temperature of the at least one sensor module and drift of the at least one sensor module to ensure accuracy of measurements performed by the sensors of the at least one sensor module;
     determining, at least in part from the received first signals, whether a depletion of the product has occurred;
     in response to a determination that a depletion of the product has occurred, automatically transmitting a request for an additional quantity of the product, so as to facilitate an automatic replenishment of the product;
     determining a consumption pattern of the product from multiple ones of the first signals received at different times to indicate how much quantity of the product is consumed over a time period; and
     controlling the at least one sensor module to decrease a frequency of the measurements performed by the sensors of the at least one sensor module in response to the consumption pattern of the product indicating that use of the product is not expected, to extend time spent by the wireless transceiver in the sleep mode and decrease power consumption of the at least one sensor module and thereby conserve life of a battery of the at least one sensor module; and
     monitor a price change pattern in response to the consumption pattern of the product and delay reordering until a target lowest price is reached.

2. The system of claim 1, wherein the request comprises one or more of an order for the additional quantity of the product, an alert to restock the product, or a request for delivery of the additional quantity of the product.

3. The system of claim 1, wherein the monitored quantity of the product is one or more of a weight of the product, a volume of the product, a level of the product, and a number of units of the product, and wherein the sensors are further configured for measuring one or more of the weight of the product, the volume of the product, the level of the product, and number of units of the product.

4. The system of claim 3, wherein each sensor module includes a housing having an upper surface configured to support a container of the product thereon, the sensors of each sensor module being arranged to measure the monitored quantity of the product.

5. The system of claim 1, wherein
each sensor module is further configured to transition its wireless transceiver from the sleep mode to a wake mode in response to a determination that the sensors of the sensor module have measured a change in the monitored quantity of the product that exceeds a predetermined threshold value.

6. The system of claim 5, wherein each sensor module is further configured to, upon transitioning its wireless transceiver from the sleep mode to the wake mode, transmit information via a wireless local area network without transmitting a handshake request, so as to reduce energy consumption of the battery of each sensor module.

7. The system of claim 1, wherein the determining whether a depletion of the product has occurred is performed at least in part from both the received first signals and the determined consumption pattern.

8. The system of claim 1, wherein the request for an additional quantity of the product is an order of the additional quantity of the product.

9. The system of claim 8, wherein the instructions further include instructions for, prior to automatically transmitting the order, adding a quantity of another product to the order, so as to group the additional quantity of the product and the quantity of another product into a single shipment.

10. The system of claim 8, wherein the automatically transmitting the request for the additional quantity of the product further comprises:
determining a lowest price for the order from among multiple sellers of the product, and an estimated time at which the order may be placed at the lowest price, by monitoring a price change pattern across the multiple sellers; and
placing the order at the estimated time and for the lowest price.

11. The system of claim 8, wherein the automatically transmitting the request for the additional quantity of the product further comprises:
determining a minimum order threshold representing a threshold amount of the product to be ordered;
adjusting the ordered quantity of the product to meet at least the minimum order threshold; and
placing the order for the adjusted quantity of the product.

12. The system of claim 1, further comprising a flexible sheet having the at least one sensor module affixed thereto, the sensors of the at least one sensor module affixed thereto being positioned to measure the quantity of the product within its supported container when the flexible sheet supports the container of the product thereon.

13. The system of claim 12, wherein the sensors of the at least one sensor module are arranged to measure the quantity of multiple ones of the products supported on the flexible sheet.

14. The system of claim 1, wherein the determining whether a depletion of the product has occurred further comprises determining the depletion at least in part according to output of one or more machine learning models.

15. The system of claim 1:
wherein the instructions further comprise instructions for receiving sets of criteria for fulfilling the request from a vendor, and selecting one or more of the sets of criteria according to a comparison of the sets of criteria to each other; and
wherein the automatically transmitting the request for the additional quantity of the product further comprises automatically transmitting the a request for fulfillment according to the selected one or more of the sets of criteria.

16. The system of claim 1, wherein the instructions further comprise instructions for receiving information describing the monitored product.

17. The system of claim 1, wherein each sensor module includes at least one of a strain gauge, a load cell, a force sense resistor, a time-of-flight optical photoelectric sensor, a level sensor, a limit switch, or a camera.

18. The system of claim 1, wherein:
the monitored quantity of the product includes one or more of a volume of the product and a level of the product; and
each sensor module includes one or more a photoelectric sensor and a camera configured to measure one or more of the volume of the product and the level of the product.

19. The system of claim 1, wherein:
the monitored quantity of the product includes a number of units of the product remaining; and
each sensor module includes limit switches to measure the number of units of the product remaining.

20. A method for facilitating automated product reorder, the method comprising:
receiving, from one or more battery powered sensor modules performing measurements of one or more properties of a product for monitoring a quantity of the product, first signals corresponding to the monitored quantity of the product, each sensor module including a wireless transceiver that is configured to operate in a sleep mode when the wireless transceiver is not to send or receive data;
sending, in response to receipt of the first signals, second signals to the one or more sensor modules to update firmware of the one or more sensor modules;
sending, in response to receipt of the first signals, third signals to the one or more sensor modules for calibrating the one or more sensors modules, to compensate for temperature of the one or more sensor modules and drift of the one or more sensor modules to ensure accuracy of measurements performed by the one or more sensor modules;
determining, at least in part from the first signals, whether a depletion of the product has occurred;
in response to a determination that the product has depleted below a predetermined user set threshold, automatically transmitting a request for an additional quantity of the product, so as to facilitate an automatic replenishment of the product;
determining a consumption pattern of the product from multiple ones of the first signals received at different times to indicate how much quantity of the product is consumed over a time period;
controlling the one or more sensor modules to decrease a frequency of the measurements performed by the one of more sensor modules in response to the consumption pattern of the product indicating that use of the product is not expected, to extend time spent by the wireless transceiver of the sensor module in the sleep mode and decrease power consumption of the one or more sensor modules and thereby conserve life of a battery of the one or more sensor modules; and monitoring a price change pattern in response to the consumption pattern of the product and delay reordering until a target lowest price is reached.

21. The method of claim 20, wherein the request comprises one or more of an order for the additional quantity of the product, an alert to restock the product, or a request for delivery of the additional quantity of the product.

22. The method of claim 20, wherein the quantity is a weight, and wherein the sensor modules are further configured for measuring the weight of the product.

23. The method of claim 20, wherein
each sensor module is further configured to transition its wireless transceiver from the sleep mode to a wake mode in response to a monitored change in the quantity of the product that exceeds a predetermined threshold value.

24. The method of claim 23, wherein each sensor module is further configured to, upon transitioning its wireless transceiver from the sleep mode to the wake mode, transmit information via a wireless local area network without transmitting a handshake request, so as to reduce energy consumption of the battery of each sensor module.

25. The method of claim 20, wherein determining whether a depletion of the product has occurred is performed at least in part from both the received first signals and the determined consumption pattern.

26. The method of claim 20, wherein the request for an additional quantity of the product is an order of the additional quantity of the product.

27. The method of claim 26, further comprising, prior to automatically transmitting the order, adding a quantity of another product to the order, so as to group the additional quantity of the product and the quantity of another product into a single shipment.

28. The method of claim 26, wherein the automatically transmitting the request for the additional quantity of the product further comprises:
determining a lowest price for the order from among multiple sellers of the product, and an estimated time at which the order may be placed at the lowest price, by monitoring a price change pattern across the multiple sellers; and
placing the order at the estimated time and for the lowest price.

29. The method of claim 26, wherein the automatically transmitting the request for the additional quantity of the product further comprises:
determining a minimum order threshold representing a threshold amount of the product to be ordered;
adjusting the ordered quantity of the product to meet at least the minimum order threshold; and
placing the order for the adjusted quantity of the product.

30. The method of claim 20, wherein the determining whether a depletion of the product has occurred further comprises determining the depletion at least in part according to output of one or more machine learning models.

31. The method of claim 20, further comprising receiving sets of criteria for fulfilling the request, and selecting one or more of the sets of criteria according to a comparison of the sets of criteria to each other;
wherein the automatically transmitting the request for the additional quantity of the product further comprises automatically transmitting the request for fulfillment according to the selected one or more of the sets of criteria.

32. The method of claim 20, further comprising receiving information describing the monitored product.

33. The method of claim 20, wherein each sensor module includes at least one of a strain gauge, a load cell, a force sense resistor, a time-of-flight optical photoelectric sensor, a level sensor, a limit switch, or a camera.

34. The method of claim 20, further comprising automatically transmitting a request for a predetermined add-on product to include in a shipment including the additional quantity of the product.

35. The method of claim 20, wherein the one or more sensor modules comprise a plurality of sensor modules sensing a common characteristic of the product to monitor the quantity of the product.

36. The method of claim 20, further comprising associating a stock-keeping unit (SKU) with the product.

37. A non-transitory computer-readable storage medium storing executable instructions that, when executed by an electronic computing device, cause the electronic computing device to:
receive, from at least one sensor module having battery-powered sensors configured for performing measurements of one or more properties of a product for monitoring a quantity of the product, first signals corresponding to the monitored quantity of the product, each sensor module including a wireless transceiver that is configured to operate in a sleep mode when the wireless transceiver is not to send or receive data;
send, in response to receipt of the first signals, second signals to the at least one sensor module to update firmware of the at least one sensor module;
send, in response to receipt of the first signals, third signals to the at least one sensor module for calibrating the at least one sensor module, to compensate for temperature of the at least one sensor module and drift of the at least one sensor module to ensure accuracy of measurements performed by the at least one sensor module;
determine, at least in part from the received first signals, whether a depletion of the product has occurred;
in response to a determination that a depletion of the product has occurred, automatically transmit a request for an additional quantity of the product, so as to facilitate an automatic replenishment of the product;
determine a consumption pattern of the product from multiple ones of the first signals received at different times to indicate how much quantity of the product is consumed over a time period;
control the at least one sensor module to decrease a frequency of the measurements performed by the sensors of the at least one sensor module in response to the consumption pattern of the product indicating that use of the product is not expected, to extend time spent by the wireless transceiver of the at least one sensor module in the sleep mode and decrease power consumption of the at least one sensor module and thereby conserve life of a battery of the at least one sensor module; and
monitor a price change pattern in response to the consumption pattern of the product and delay reordering until a target lowest price is reached.

* * * * *